May 17, 1960     F. H. GOODING     2,937,336
APPARATUS FOR TESTING ELECTRIC INSULATION
Filed April 26, 1957
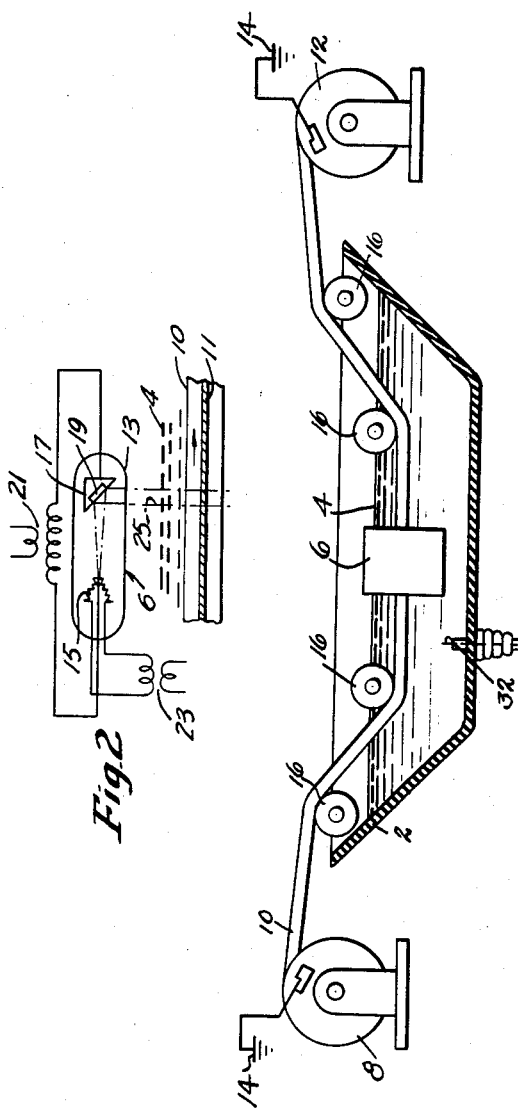
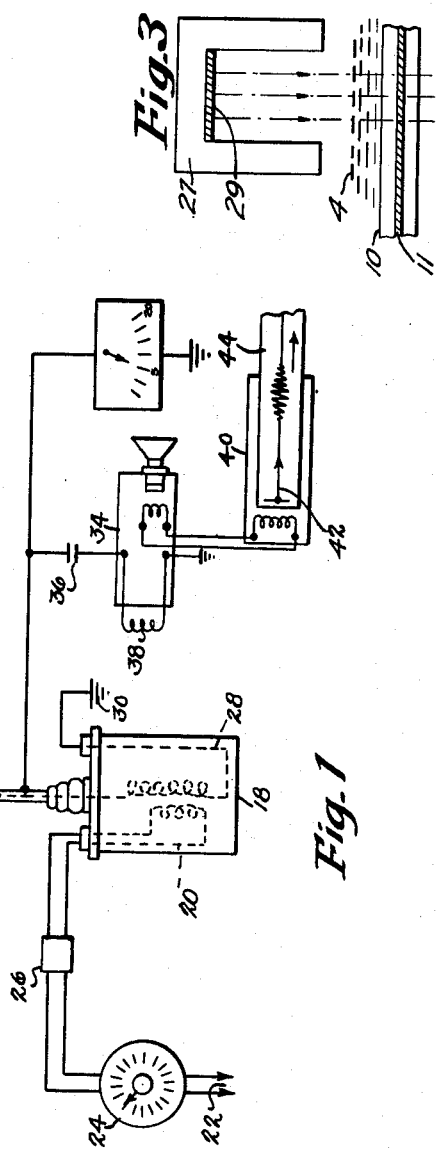
INVENTOR.
Francis H. Gooding
BY
James G. Bethell
ATTORNEY.

United States Patent Office 2,937,336
Patented May 17, 1960

2,937,336

APPARATUS FOR TESTING ELECTRIC INSULATION

Francis H. Gooding, Lodi, N.J., assignor to The Okonite Company, Passaic, N.J., a corporation of New Jersey Application April 26, 1957, Serial No. 655,422

5 Claims. (Cl. 324—54)

My invention relates to the testing of electric insulation, such as, by way of example, the insulation of unshielded as well as shielded electric wires and cables. One of the objects of my invention is to detect and locate detrimental voids of air spaces in the insulation, such as would lead eventually to breakdown and failure.

Another object of my invention is to provide for continuous testing of electric insulation, so that testing may be conducted on unlimited lengths of insulation, such as the insulation of wire and cable, for example, as distinguished from prior practice in which samples only a few feet in length are subjected to a corona test for detecting the presence of voids or air spaces under the erroneous assumption that the test samples are representative of a 5,000 foot-length or more of wire or cable.

A further object of the invention is to provide that all of the insulation shall be tested, as distinguished from merely localized areas.

In general, my invention provides for continuously advancing the insulation to be tested, the insulation being provided with an internal, continuous conductor, through water or other conducting fluid past a source of electromagnetic radiation, such as a source of gamma rays or X-rays, or past a source of a beam of electrons, such as beta rays, while a difference in potential is being applied across the insulation and its conductor. If the insulation to be tested is provided with a metal shield or covering, it is necessary to employ either the gamma rays or the X-rays in that they are capable of penetrating the metal shield and still have sufficient energy to ionize the gas in a void or air space within the insulation.

When a void or air space in the insulation moves into the rays from the radiation source, the gas within the void becomes ionized, and a definite number of ion pairs is produced, and, inasmuch as a difference in potential is being applied across the insulation and conductor, the positive ions will move toward the negative conductor, and the negative ions will move toward the positive conductor. This displacement of charge or high-frequency pulse produces a variation in the dielectric stress in the insulation.

More specifically, the insulation, having its conductor grounded, is advanced continuously through water or other suitable conducting fluid contained in an insulating tank, the conducting fluid being connected to a high-voltage source. A source of electromagnetic radiation, such as gamma or X-rays, or a source of a beam of electrons, such as beta rays, is contained within the tank. Because any voids or air spaces existing in the insulation eventually are exposed to the radiation rays, the voltage I employ in applying a difference in potential across the insulation and conductor may be below the specified corona-level voltage minimum. This is of advantage in that it avoids ionization of the air at the surface of the conducting fluid as the insulation passes through the testing tank. Or the test voltage may be above the corona-level voltage minimum, in which case there will be an increase in ionization when an ionizable void or air space comes within the influence of the radiation rays.

In the accompanying drawing,

Fig. 1 shows in part-sectional elevation an embodiment of my invention as applied to the testing of the insulation of electric wire and cable.

Fig. 2 is a schematic view illustrating the application of X-rays to the material being tested; and Fig. 3 is a view similar to Fig. 2 illustrating the application of gamma rays or beta rays to the material being tested.

Referring to the drawing in detail, 2 designates a tank of insulating material containing a conducting fluid 4, such as water, for example 6 designates a source of electromagnetic radiation rays, such as gamma or X-rays, or a source of a beam of electrons, such as beta rays. Adjacent one end of the tank 2 is a let-off reel 8, carrying the wire or cable 10, the insulation of which is to be tested. Adjacent the other end of the tank 2 is a take-up reel 12.

In practice, the cable 10 is drawn continuously from the reel 8 through the conducting fluid 4, past the radiation source 6, and wound upon the take-up reel 12. The conductor 11 of the wire or cable 10 is grounded at the reels 8 and 12, as indicated at 14. The elements 16 shown within the tank 2 are guiding elements for the cable 10 and may or may not be employed.

The radiation source 6 has been illustrated somewhat schematically in Fig. 2, from which it will be seen that the same comprises conventional X-ray tube 13, containing filament 15, anode 17, and target 19. 21 and 23 designate the usual transformers for supplying current to the tube elements. It will be appreciated that this equipment is so positioned that, as the cable 10 is passing through the tank 2, it will pass through the rays 25 from the target 19. In Fig. 3 I have illustrated schematically a source of gamma rays or beta rays. This is conventional equipment and essentially comprises a housing 27 and radio-active material 29 within the housing. This device is so placed relative to the cable 10 under test that the cable will pass through the gamma rays or beta rays being emitted by the radio-active material 29.

18 designates a transformer the primary winding 20 of which is connected to a 60-cycle power source 22 through voltage regulator 24 and circuit breaker 26. The secondary of the transformer 18 is designated 28. One side of this secondary is grounded at 30, the other side of the secondary extending through the tank 2 into the conducting fluid 4, as shown at 32.

It will be appreciated that, as the wire or cable 10, with its conductor grounded, is drawn from the reel 8 to take-up reel 12, a difference in potential is applied continuously and progressively to the length of wire or cable immersed in the conducting fluid in the tank 2 across the conductor and its insulating sheath, thereby creating a dielectric stress in the insulation. It will be apparent also that any voids or air spaces existing in the insulation will be exposed to the rays from the source 6 as the wire or cable moves through the tank 2. Should there be a void or air space in the insulation, the gas therein will become ionized when the void or air space comes under the influence of the rays from the source 6, and a definite number of ion pairs will be produced, and, inasmuch as a difference in potential is being applied across the length of conductor and insulating sheath in the tank 2, the positive ions will move toward the negative conductor, and the negative ions will move toward the positive conductor. This displacement of charge or high-frequency pulse creates a variation in the dielectric stress in the insulation. To detect this variation in dielectric stress, aural and/or visual means have been provided for recording this variation.

The aural recording means is in the nature of a radio receiver 34, connected through corona-free condenser 36 between ground and that side of the transformer secondary 28 which is connected to the conducting fluid 4 in the insulating tank 2. The charging current of the condenser 36 is by-passed around the receiver 34 by connecting a small inductor 38 across the receiver terminals. The inductance of 38 is sufficient to present a high impedance to the 60-cycle power current passing through the high-voltage condenser 36, so that the receiver will respond only to the high-frequency pulse caused by exposure of a void to the rays from the radiation source 6 and the difference of potential being applied to the wire or cable across its sheath and conductor by the transformer 18.

The visual recording device may be a recording galvanometer 40, for example, connected to the output of the recording receiver 34, the needle and recording tape of the galvanometer being designated 42 and 44, respectively.

It will be apparent from all of the foregoing that my invention provides for examining the insulation of electric wires and cables to detect and locate any detrimental voids or air spaces which may be present in the insulation and which eventually would lead to breakdown and failure of the wire or cable.

It will be seen also that my invention provides for establishing a dielectric stress in the insulation being tested by maintaining a potential difference in the wire or cable across the conductor and its insulating sheath while the gas in any void or air space in the area being stressed is being exposed either to electromagnetic radiation (gamma rays or X-rays) if the insulation is shielded or to a beam of electrons, such as beta rays, if the insulation is unshielded.

As distinguished from prior practice where it is customary to employ voltages as much as 50% higher than the rated operating voltage of the wire or cable being tested, the present invention provides for detection of detrimental voids or air spaces by employing voltages which may be below the rated operating voltage of the wire or cable being tested.

It is to be understood that changes may be made in the details of construction and arrangement of parts hereinabove described without departing from the spirit and scope of the invention.

What I claim is:

1. Apparatus for detecting and locating voids and air spaces in the insulation of insulated wires and cables, said apparatus comprising, in combination, an insulated tank containing a conducting fluid; means for continuously progressing an insulated wire or cable, having its conductor grounded, through said fluid; a high-voltage source connected between ground and said fluid for maintaining a potential difference between the insulation and the conductor of the wire or cable, thereby to establish continuously and progressively a dielectric stress in the insulation as the wire or cable progresses through said fluid; a radiation source to which the stressed insulation is continuously and progressively exposed as it moves through said fluid, to ionize the gas in any void or air space present in the area being tested, thereby to vary said stress; and a device connected between ground and that side of the high-voltage source which is connected to the conducting fluid for indicating such variation in dielectric stress as it occurs.

2. Apparatus for detecting and locating voids and air spaces in the insulation of insulated wires and cables, said apparatus comprising, in combination, an insulated tank containing a conducting fluid; means for continuously progressing an insulated wire or cable, having its conductor grounded, through said fluid; a high-voltage source connected between ground and said fluid for maintaining a potential difference between the insulation and the conductor of the wire or cable, thereby to establish continuously and progressively a dielectric stress in the insulation as the wire or cable progresses through said fluids; a source of beta rays to which the stressed insulation is continuously and progressively exposed as it moves through said fluid, to ionize the gas in any void or air space present in the area being tested, thereby to vary said stress; and a device connected between ground and that side of the high-voltage source which is connected to the conducting fluid for indicating such variation in dielectric stress as it occurs.

3. Apparatus for detecting and locating voids and air spaces in the insulation of electric wires and cables, said apparatus comprising, in combination, an insulated tank containing a conducting fluid; means for continuously progressing an insulated wire or cable, having its conductor grounded, through said fluid; a high-voltage source connected between ground and said fluid for maintaining a potential difference between the insulation and the conductor of the wire or cable, thereby to establish continuously and progressively a dielectric stress in the insulation as the wire or cable progresses through said fluid; a source of gamma rays to which the stressed insulation is continuously and progressively exposed as it moves through said fluid, to ionize the gas in any void or air space present in the area being tested, thereby to vary said stress; and a device connected between ground and that side of the high-voltage source which is connected to the conducting fluid for indicating such variation in dielectric stress as it occurs.

4. Apparatus for detecting and locating voids and air spaces in the insulation of electric wires and cables, said apparatus comprising, in combination, an insulated tank containing a conducting fluid; means for continuously progressing an insulated wire or cable, having its conductor grounded, through said fluid; a high-voltage source connected between ground and said fluid for maintaining a potential difference between the insulation and the conductor of the wire or cable, thereby to establish continuously and progressively a dielectric stress in the insulation as the wire or cable progresses through said fluid; a source of X-rays to which the stressed insulation is continuously and progressively exposed as it moves through said fluid, to ionize the gas in any void or air space present in the area being tested, thereby to vary said stress; and a device connected between ground and that side of the high-voltage source which is connected to the conducting fluid for indicating such variation in dielectric stress as it occurs.

5. Apparatus for detecting and locating voids and air spaces in electric insulation, said apparatus comprising, in combination, an insulated tank containing a conducting fluid; means for continuously progressing the insulation being tested through said fluid, the insulation being provided with a continuous internal conductor; means for grounding the conductor; a high-voltage source connected between ground and said fluid for maintaining a potential difference between the insulation and the conductor, thereby to establish continuously and progressively a dielectric stress in the insulation as the insulation progresses through said fluid; a radiation source to which the stressed insulation is continuously and progressively exposed as it moves through said fluid, to ionize the gas in any void or air space present in the area being tested, thereby to vary said stress; and a device connected between ground and that side of the high-voltage source which is connected to the conducting fluid for indicating such variation in dielectric stress as it occurs.

References Cited in the file of this patent

UNITED STATES PATENTS

| | | |
|---|---|---|
| 2,750,562 | Starr | June 17, 1956 |
| 2,794,169 | Gooding | May 28, 1957 |